US006328293B1

(12) United States Patent
Olsen (10) Patent No.: US 6,328,293 B1
(45) Date of Patent: Dec. 11, 2001

(54) MULTI-LINKAGE SUSPENSION SYSTEM INCLUDING OUTBOARD ISOLATORS

(75) Inventor: Kirk W. Olsen, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/156,423

(22) Filed: Sep. 18, 1998

(51) Int. Cl.[7] ..................................................... F16F 15/08
(52) U.S. Cl. ...................... 267/140.11; 248/554; 244/54; 267/141.1
(58) Field of Search ............................. 267/141, 141.1, 267/141.2, 141.3, 293, 294, 140.11; 248/554, 555, 276.1; 244/54

(56) References Cited

U.S. PATENT DOCUMENTS

| 2,365,421 | * | 12/1944 | Lord ........................................... 248/5 |
| 2,395,949 | | 3/1946 | Wilkins ..................................... 267/1 |
| 2,529,955 | | 11/1950 | Morley ...................................... 248/5 |

(List continued on next page.)

FOREIGN PATENT DOCUMENTS

| 0 429 100 A1 | 5/1991 | (EP) . |
| 2 010 969 A | 7/1979 | (GB) . |
| 2 043 573 A | 10/1980 | (GB) . |

OTHER PUBLICATIONS

Elastomeric Rod End Bearings: A Solution For Improving Reliability and Maintainability, Lord Corporation, Staples, Jones, Schmidt, LL-6501, pp 1–24, 1984.

Safetied Tube Form Mounts (STA Series), Lord Corporation, Vibration, Shock, Noise Control Data, DS–7300g, 1980.

United States Patent application No.: 08/972,063, filed on: Nov. 17, 1997, Entitled Readily Changeable Isolator And Method Of Assembly Therefor, by Thomas R. Law and Paul J. Snyder, Jr.

Rod Ends, Alinabal Webcite http://www.alinabal.com/mtd/rodends.html, pp 1–4, 1997.

Dynaflex Elastomeric Rod Ends Noise and Vibration Control, Lord Corporation and Alinabal, 1996.

Rubber in Engineering Practice, Davey and Payne, Palmerton Publishing Co., Inc., p 161, 1964.

*Primary Examiner*—Robert J. Oberleitner
*Assistant Examiner*—Bradley King
(74) *Attorney, Agent, or Firm*—Randall S. Wayland; James J. Bindseil; Michael M. Gnibus (57) ABSTRACT

A multi-linkage suspension system (20) including isolators (32) positioned at the outboard ends of the linkages (26) for suspending and isolating an engine (22), such as an Auxiliary Power Unit (APU), from a structure (24), such as an aircraft fuselage. The system (20) has a plurality of linkages (26) extending from the engine (22) towards the structure (24); each linkages (26) including an inboard (28) and outboard (30) end, a plurality of outboard isolators (32) attached at the outboard ends (30), a bracket (27) for connecting the outboard isolators (32) to the structure (24), a rod end (34), which is preferably elastomeric and includes an elastomer layer (36), for connecting the plurality of linkages (26) to the engine (22). The system (20) is easily tuned and provides for common components and the location of the isolators (32) minimizes direct exposure to heat and aggressive fluids.

11 Claims, 10 Drawing Sheets

U.S. PATENT DOCUMENTS

| | | | | |
|---|---|---|---|---|
| 2,720,370 | * | 10/1955 | Hasbrouck | 248/5 |
| 3,288,404 | | 11/1966 | Schmidt et al. | 248/5 |
| 3,727,862 | | 4/1973 | Kaufhold et al. | 244/54 |
| 3,756,551 | * | 9/1973 | Bishop | 248/358 R |
| 3,836,100 | | 9/1974 | Von Hardenberg et al. | 244/54 |
| 4,038,733 | | 8/1977 | McCloskey | 29/149.5 B |
| 4,044,973 | * | 8/1977 | Moorehead | 244/54 |
| 4,097,011 | | 6/1978 | White | 248/5 |
| 4,266,741 | | 5/1981 | Murphy | 244/54 |
| 4,571,936 | | 2/1986 | Nash et al. | 60/39.31 |
| 4,603,821 | | 8/1986 | White | 244/54 |
| 4,624,425 | | 11/1986 | Austin et al. | 244/13 |
| 4,717,094 | | 1/1988 | Chee | 244/54 |
| 4,720,060 | * | 1/1988 | Yana | 244/17.27 |
| 4,805,851 | | 2/1989 | Herbst | 244/54 |
| 4,811,919 | | 3/1989 | Jones | 244/54 |
| 4,821,980 | | 4/1989 | Clausen et al. | 244/54 |
| 4,883,263 | * | 11/1989 | Buhl | 267/293 |
| 5,028,001 | * | 7/1991 | Bender et al. | 244/54 |
| 5,092,538 | | 3/1992 | Denney | 244/54 |
| 5,108,045 | | 4/1992 | Law et al. | 241/54 |
| 5,110,081 | | 5/1992 | Lang, Jr. | 248/635 |
| 5,127,607 | | 7/1992 | McGuire | 244/54 |
| 5,176,339 | | 1/1993 | Schmidt | 244/54 |
| 5,316,240 | | 5/1994 | Girard et al. | |
| 5,351,930 | | 10/1994 | Gwinn et al. | 248/557 |
| 5,413,320 | | 5/1995 | Herbst | 267/140.13 |
| 5,551,650 | | 9/1996 | Southward et al. | 244/54 |
| 5,597,173 | * | 1/1997 | Schindler et al. | 280/690 |
| 5,687,948 | | 11/1997 | Whiteford et al. | 248/635 |
| 5,762,295 | | 6/1998 | McGuire et al. | 244/54 |
| 5,806,792 | | 9/1998 | Brossier et al. | |
| 5,842,677 | * | 12/1998 | Sweeney et al. | 248/635 |
| 5,902,050 | * | 5/1999 | Balczun et al. | 384/206 |

* cited by examiner

MULTI-LINKAGE SUSPENSION SYSTEM INCLUDING OUTBOARD ISOLATORS

FIELD OF THE INVENTION

The present invention relates generally to elastomeric mountings and systems utilizing the same for suspending an engine and, more particularly, to a suspension system for supporting and isolating an auxiliary power unit relative to an aircraft fuselage.

BACKGROUND OF THE INVENTION

An Auxiliary Power Unit (APU) provides auxiliary power to the various accessories in an aircraft (ex. lights, etc.) and is conventionally suspended by a plurality of rigid linkages which attach between the fuselage ceiling and the APU. In prior art systems, vibration transmission into the linkages is minimized by directly attaching the rigid linkages to vibration isolators located at, and secured to, the APU (see FIG. 1a). Multiple links generally attach to multiple isolators. For example, in one prior art system, seven links connect into only three isolators. Two links connect to the first and second isolators with three links attached to the third. Notably, in these systems the isolators are placed at the hot location of the engine, thus, the isolators must be manufactured from materials that can withstand very elevated temperatures. Moreover, prior art linkage members include mechanical rod ends having ball and race members to allow pivotal motions, but such mechanical rod end bearings are subject to wear and fretting and can exhibit rattle spaces which can transmit undesirable vibration into the fuselage structure.

Figure 1A:
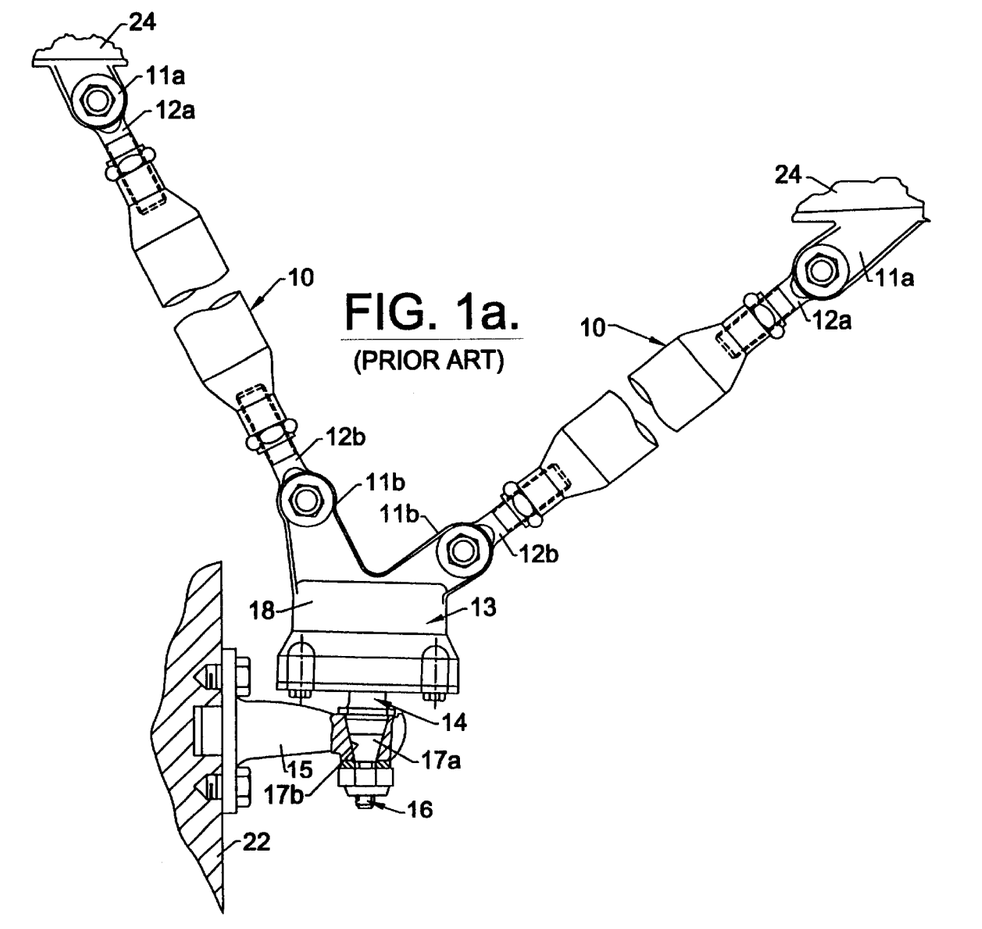
FIG. 1a is a side view of a portion of a prior art APU suspension system.

One example of a Prior Art APU suspension system is shown in FIG. 1a and suspends an APU 22 (only a portion is shown) from multiple rigid linkage assemblies 10 (only two of seven links shown) which attach at multiple spaced devises 11a located near the ceiling of the fuselage structure 24. Multiple rigid metal spherical rod end members 12a, 12b including right and left threads, respectively, are included at either end of each linkage assembly 10. Such rigid metal spherical rod ends include a steel housing and a spherical metal ball and may include a low friction race, such as manufactured from rigid low friction material such as phosfur bronze or Nyloy. Likewise, the linkages 10 attach to multiple isolators 13 (only one of three shown) located on the APU 22 by way of metal spherical rod ends 12b attached in clevis members 11b extending from the isolator housing 18. These isolators 13 include a housing 18 having a pocket formed therein for receiving the bonded inner member 14 manufactured from a fluorosilicone material as best shown in cross section in FIG. 1b.

Figure 1B:
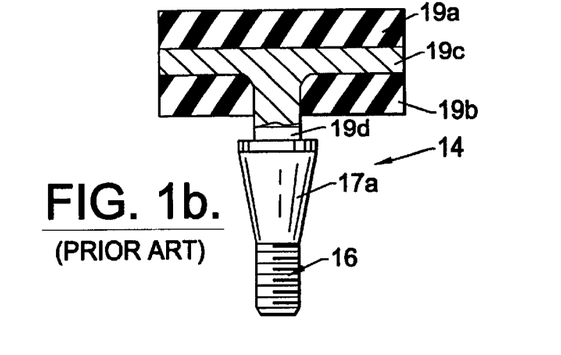

The bonded inner member 14 includes a cone bolt 16 including a tapered section 17a which is received in a like tapered section 17b formed into an engine attachment bracket 15. As shown in FIG. 1b, the bonded inner member 14 includes upper and lower elastomer pads 19a, 19b spaced above and below a flange 19c formed on the rigid inner member 19d. These prior art elastomer isolators 13 tend to be bulky, heavy and expensive, thereby leading to a system that is resultantly complex, heavy and expensive. Moreover, should any one of the linkages 10 have a resonance condition within the APU's operating frequency range, it is difficult to address it without appreciably affecting the remainder of the system. In other words, the resonance can only be addressed by changing the stiffness/damping of elastomer pads 19a, 19b. Thus, addressing the resonance may change a stiffness which appreciably affects the dynamic properties of the overall system. Furthermore, the isolators of such prior art systems are exposed to intense heat and oil, fuels and other detrimental fluid exposure. Therefore, because of such heat and fluid exposure, the use of undesirable fluorosilicone materials is mandated therein.

Efforts to mount aircraft engines which include linkages 11a, 11b can be found in U.S. Pat. No. 3,727,862 to Kaufold et al. However, Kaufold provided a fairly rigid vibration path into the structure for vertically oriented vibrations. Moreover, the spring elements are torsion bars 7a, 7b, thus do not provide any significant level of damping. Moreover, the system cannot be easily tuned. Other engine mounting systems include some form of linkage include U.S. Pat. No. 4,717,094 to Chee entitled "Aircraft Engine Mount System With Vibration Isolators," U.S. Pat. No. 3,836,100 to Von Hardenberg et al. entitled "Engine Mounting Arrangement," U.S. Pat. No. 4,805,851 to Herbst entitled "Turbine Engine Mounting Bracket Assembly," and U.S. Pat No. 5.108,045 to Law et al. entitled "Engine Mounting Assembly." The desk reference by A. B. Davey and A. R. Payne entitled "Rubber In Engineering Practice" teaches in FIG. 5.14(a) a focalized suspension system including a plurality of pivotable mounts attached between the engine bracketry and the structure. This system tends to be bulky and the isolators are still subjected to elevated temperatures.

Accordingly, there exists a need for a system for suspending and isolating an engine, such as an APU from the structure, such as an aircraft fuselage which is cost effective, light in weight, easily tuned and exhibits improved service life.

SUMMARY OF THE INVENTION

In view of the above discussion, it is a first aspect in accordance with the present invention to provide a suspension system for supporting an engine relative to a structure, comprising a plurality of linkages (struts) extending from the engine towards the structure, each of the linkages includes inboard and outboard ends, a plurality of outboard isolators attached at the outboard ends, means including a bracket for connecting the outboard isolators to the structure, and means including a rod end for connecting the plurality of linkages to the engine. Placing isolators outboard on the linkages allows each linkage to be independently tuned and places the isolator in a reduced temperature position where more durable materials and those with better dynamic properties may be employed. Moreover, since the outboard isolators experience less fluid exposure, this allows less fluid savy, yet inherently more durable materials to be utilized.

In another aspect, at least one and more preferably all the rod ends include an elastomer layer (an elastomeric rod end) which is preferably bonded to an outer surface of an inner member forming a bonded insert. The bonded insert is preferably received in a housing including a pocket formed therein and is preferably unbonded to the housing thereby allowing substantial pivotal motion yet still providing an elastomer discontinuity.

Preferably also, at least one and preferably all of the plurality of outboard isolators comprise elastomer. The elastomer preferably includes a sandwich portion loaded predominantly in compression by a weight of the engine and an integral annular portion extending axially therefrom. Preferably, at least one and more preferably all of the outboard isolators comprise opposed identical elastomer mountings. A stud is received through a bore formed through at least one of the mountings and is likewise threaded into an outboard end of at least one of the linkages. Most preferably, at least one of the opposed mountings comprises a rigid member which has a radially extending portion and a cylindrical portion.

In another aspect, the means for connecting the plurality of linkages to the engine comprises a plurality of brackets and a plurality of separate clevis members, one each being secured to each bracket.

According to a further aspect, the invention provides a suspension system for supporting an engine relative to a structure comprising a plurality of linkage assemblies extending from the engine towards the structure, wherein each of the plurality of linkages assemblies includes a linkage, an outboard isolator attached at the link's outboard end and a rod end attached at the link's inboard end, a bracket adapted for attachment to the engine and a clevis member secured to the bracket wherein the rod end is received by the clevis member for interconnecting individual linkage assemblies to the engine.

The mounting system of the present invention overcomes the shortcomings of the afore-described systems. More particularly, the system allows for tuning of each linkage assembly individually without significantly or adversely affecting the performance of the overall system. This tunable feature allows a shift in response frequencies of the linkage away from major operating frequencies. Moreover, dynamic changes in the overall system can be easily accomplished, if desired. Further, the system allows for the use of a simple and common isolator configuration which is positioned at a maximum distance from the engine, thus minimizing exposure to heat and aggressive fluids. In a preferred aspect, the addition of a elastomer rod end allows an additional elastomer discontinuity in the vibration path. Furthermore, the system provides lower weight and cost and ease of change-out of the isolator assemblies without the need to support the engine. The mounting system of the present invention is particularly useful for suspending an APU system of an aircraft.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1b is a cross sectioned side view of the bonded inner member in the prior art APU suspension system of FIG. 1a;

DETAILED DESCRIPTION OF THE INVENTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2A:
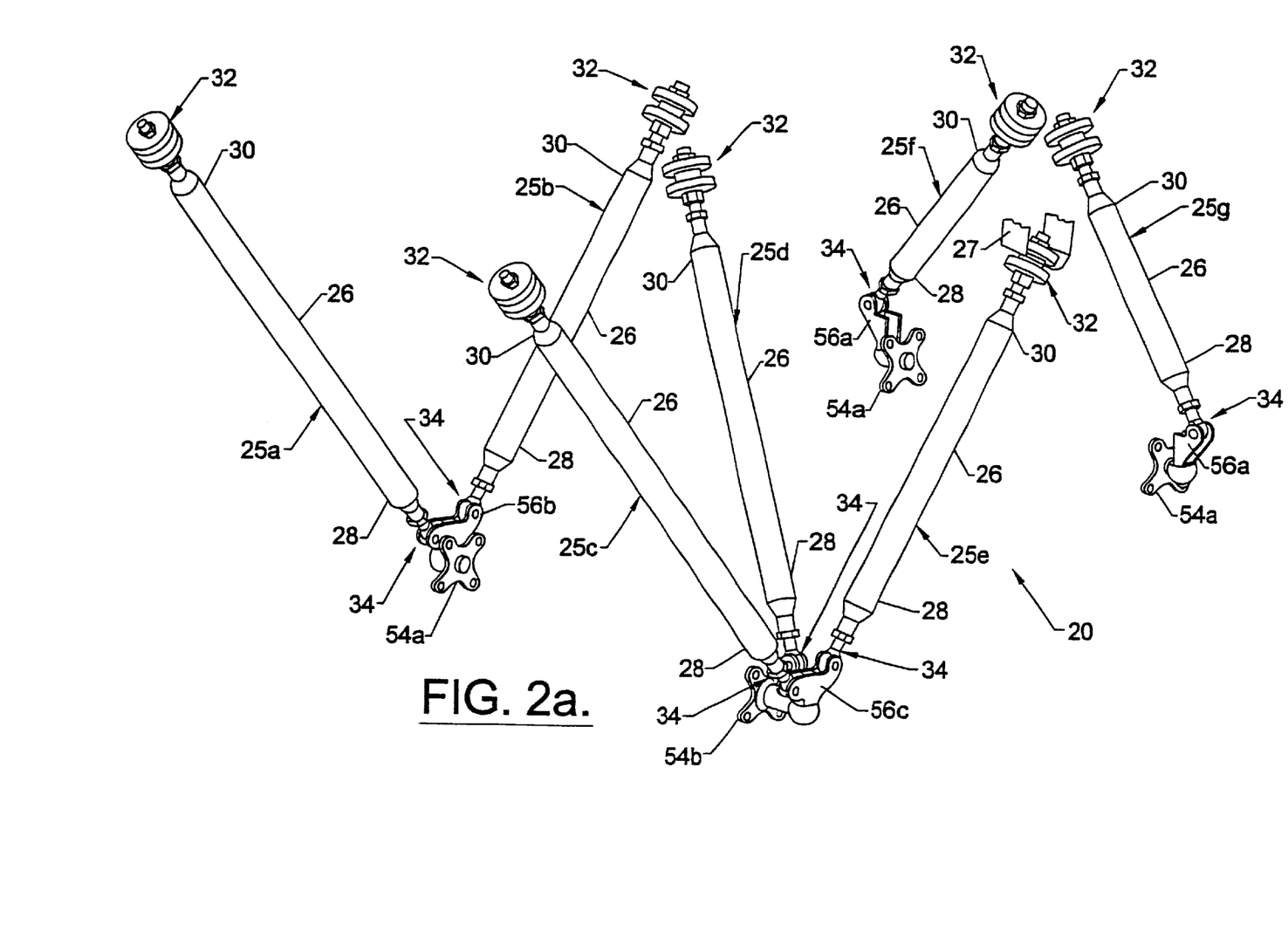
FIG. 2a is an isometric view of a four point mounting system according an embodiment of the present invention with the engine and structure removed for clarity.
Figures 3, 4:
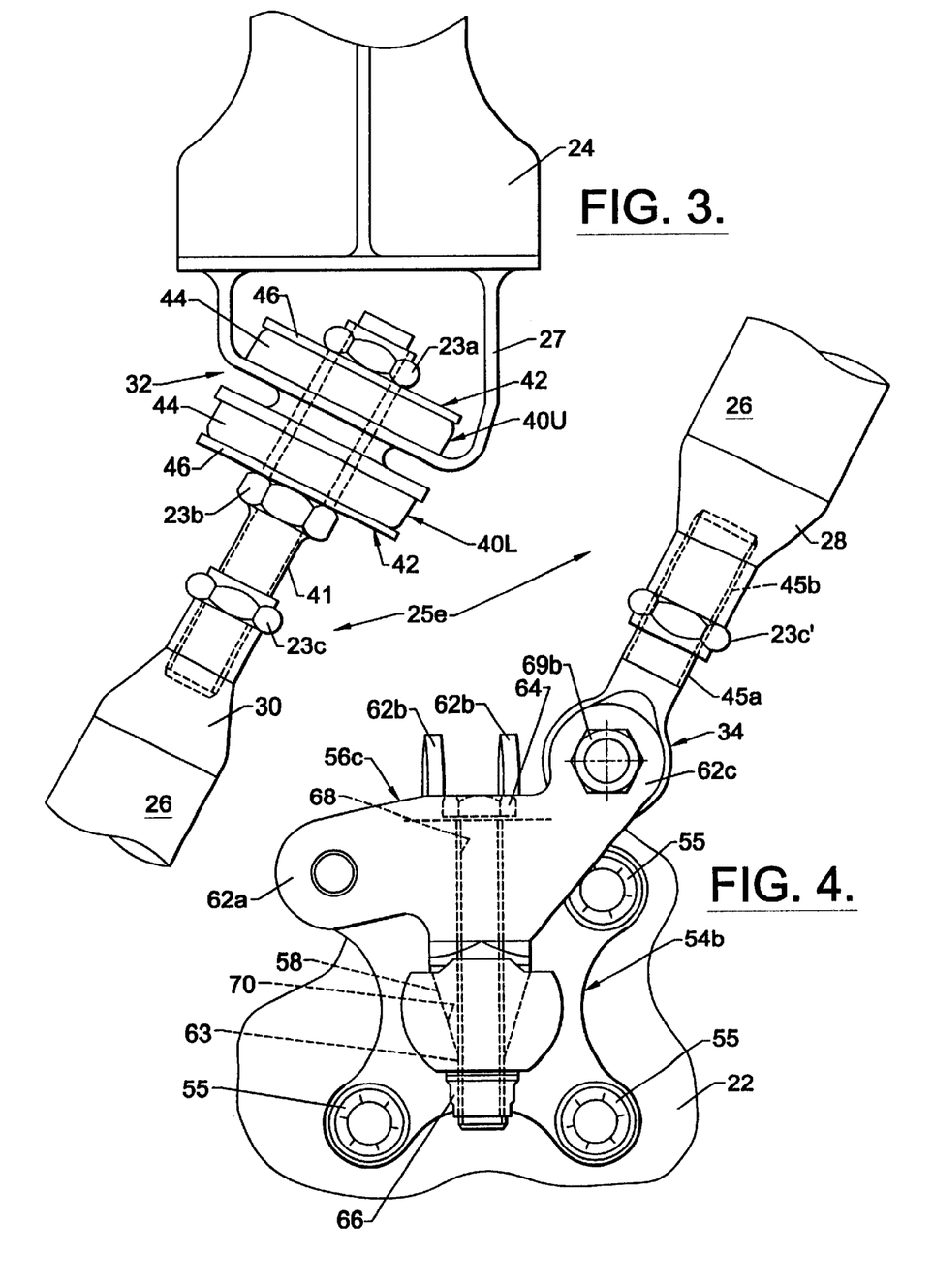
FIG. 3 is a side view of the outboard isolator.
FIG. 4 is a side view of the inboard elastomer rod end interconnected to the clevis and bracket.
Figure 5:
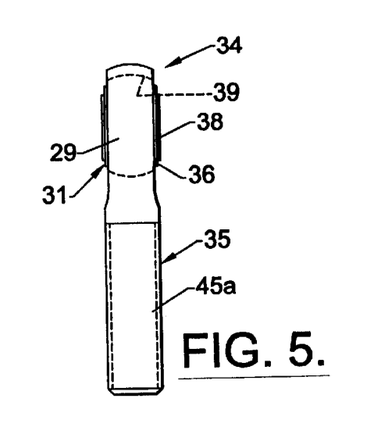
FIG. 5 is a side view of the inboard elastomer rod end.
Figure 6:
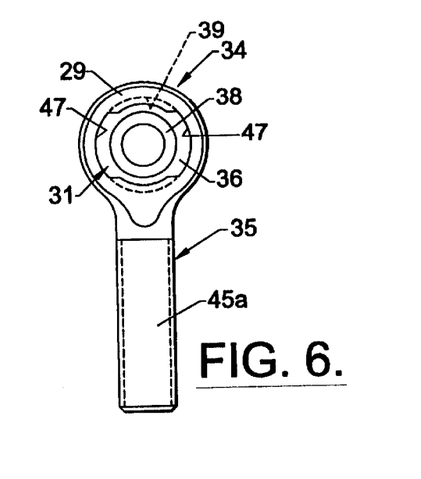
FIG. 6 is a frontal view of the inboard elastomer rod end.

Referring now to FIGS. 2a and 3–4, a suspension system 20 according to an embodiment of the present invention is illustrated. The system 20 includes a APU or engine 22 suspended and isolated relative to a fuselage structure 24. In FIG. 2a, a four point mounting system has been depicted with the engine and fuselage removed for clarity. According to the invention, the suspension system 20 comprises a plurality of rigid linkages 26 extending outwardly and preferably generally upwardly from the engine 22 towards the structure 24. Each of the plurality of linkages 26 includes an inboard end 28 adjacent to the engine 22 and an outboard end 30 adjacent to the structure 24 as best shown in FIG. 2a.

Figures 7A, 7B, 8:
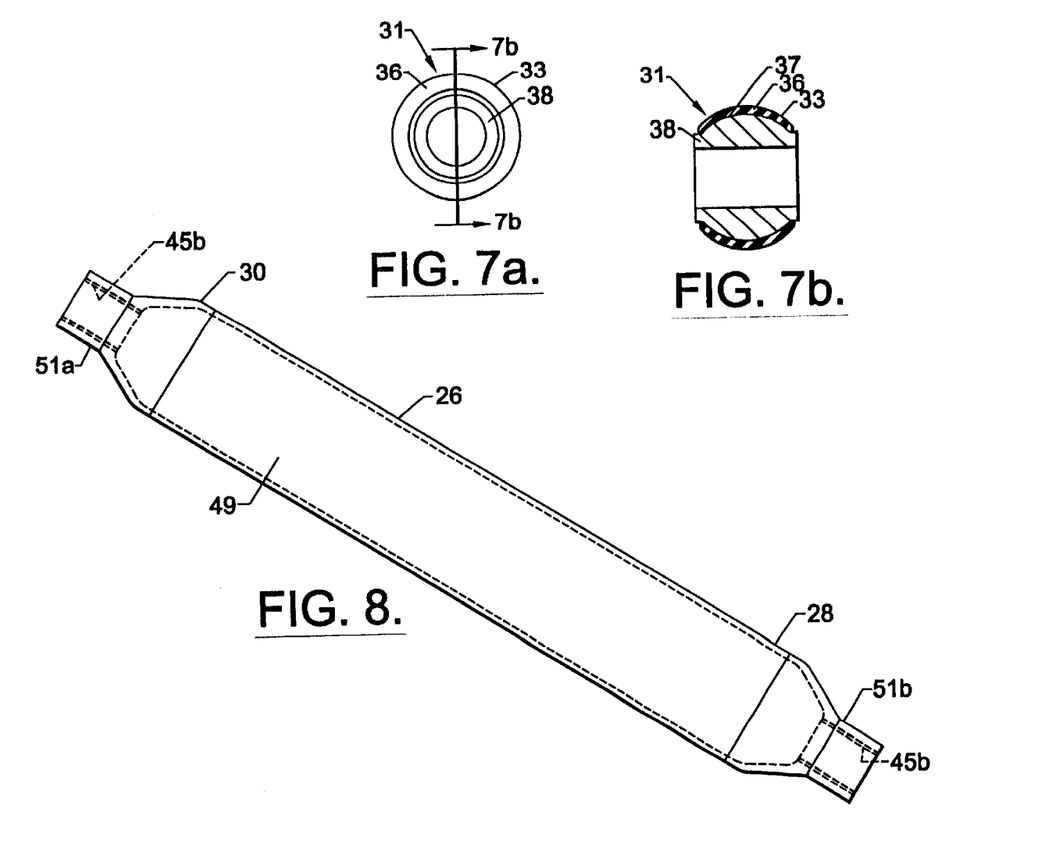
FIG. 7a is a side view of the bonded inner member of the elastomer rod end.
FIG. 7b is a cross-sectioned side view of the bonded inner member of FIG. 7a along line 7b—7b.
FIG. 8 is a side view of a linkage.

A plurality of outboard isolators 32 are preferably attached at the outboard ends 30 of each of the linkages 26. The plurality of outboard isolators 32 connect to the structure 24 by appropriate means, such as the upper bracketry 27 shown. The bracketry 27 may be part of the fuselage structure 24, separate brackets added thereto, or part of a substructure which itself attaches to the fuselage 24. Elastomer rod ends 34 preferably comprise the means for interconnecting the plurality of linkages 26 to the engine 22 at the inboard ends 28. At least one elastomer rod end 34 and more preferably all the elastomer rod ends in the system 20 include an elastomer layer 36 (FIG. 7b). The preferred structure of the elastomer rod end 34 will be described more fully with reference to FIGS. 5–7b below. Each of the linkage assemblies 25a–25g comprise a slender, rod like linkage 26, an outboard isolator 32 including opposed mounts 40U, 40L, and a elastomer rod end 34.

Now referring to FIGS. 3 and 9–12, in the suspension system 20, at least one of the outboard isolators, and more preferably all the outboard isolators 32 also, comprise elastomer 44. Moreover, preferably, at least one of the plurality of outboard isolators 32, and more preferably all of them, comprise opposed mountings 40U, 40L. Several preferable embodiments of such mountings being illustrated in FIGS. 11 and 12. The opposed mountings 40U, 40L are preferably identical center bonded mountings and further comprise a sandwich portion 50 and an annular portion 52. The sandwich portion 50 is loaded predominantly in compression by the weight of the engine 22 and the annular portion 52 extends axially from the sandwich portion 50 and is preferably formed integrally therewith. The annular portion 52 positions the mounting relative to the upper bracketry 27 and also accommodates any radial loading.

Figure 11:
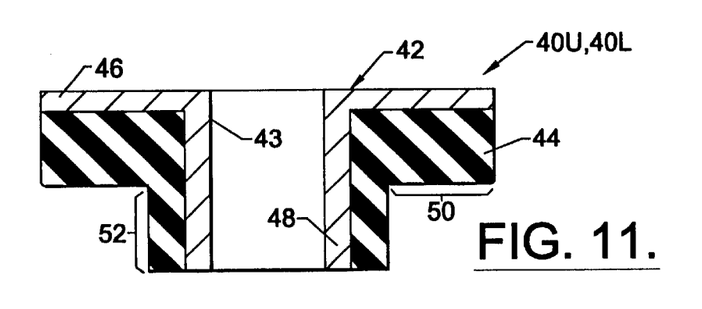
FIG. 11 is a cross sectioned side view of a first embodiment of mounting used in the outboard isolator.
Figure 12:
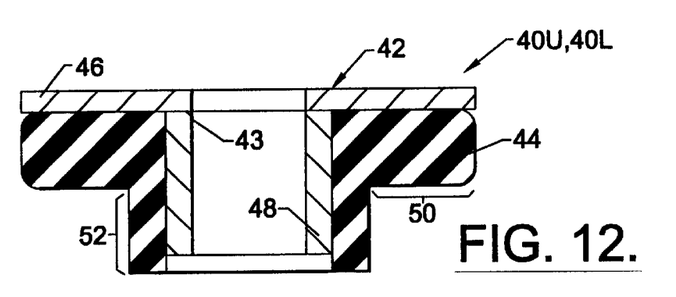
FIG. 12 is a cross sectioned side view of a second embodiment of mounting used in the outboard isolator.

Preferably, at least one of the mountings 40U, 40L and more preferably all of the mountings are manufactured from a silicone elastomer material or other like suitable high temperature, lightly damped, flexible material. The damping level of the elastomer is preferably about a loss factor of about 0.1. By way of example, and not to be considered limiting, the static spring rates of the isolators in the axial direction are between about 15,000 lbs/inch (2,627 N/mm) and 150,000 lbs/inch (26,270 N/mm) and more preferably 120,000 lbs/inch (21,000 N/mm) and in the radial direction are between about 10,000 (1,750 N/mm) and 100,000 Ibs/inch (17,500 N/mm) and more preferably about 50,000 lbs/inch (8.750 N/mm). The rigid member 42 of the mountings of FIGS. 11 and 12 are preferably titanium or stainless steel. The stiffness and/or the damping level of each individual isolator 32 may be changed to dynamically tune the system characteristics.

A stud 41 is received through a bore 43 formed through at least one, and preferably both, of the mountings 40U, 40L and the stud 41 is likewise threaded into the threaded portion 45b (FIG. 8) of the outboard end 30 of at least one of said plurality of linkages 26. A jam nut 23c on stud 41 prevents backout of the stud 41. A top nut 23a together with shoulder 23b the stud 41 secures the assembly 25e to the upper bracketry 27 and compresses the lower mount 40L between the shoulder 23b formed on the stud 41 and the bracketry 27 and the upper mount 40U between the nut 23a and the bracketry 27.

Preferably, at least one, and more preferably, all of the opposed mountings 40U, 40L comprises a rigid support member 42. The rigid member 42 preferably comprises a radially extending washer-like portion 46 and a cylindrical tube portion 48 formed adjacent thereto and extending axially therefrom. Alternatively, the rigid member 42 may be formed of two separate pieces as shown in FIG. 12 wherein the radially extending portion 46 is a disc-shaped washer and the cylindrical portion 48 is a hollow tubular cylinder. Preferably, the mountings 40U, 40L each include a sandwich elastomer portion 50 adjacent to the radially extending portion 46 and an annular portion 52 adjacent to the cylindrical portion 48; the sandwich portion 50 being formed integrally with the annular portion 52.

Figure 9:
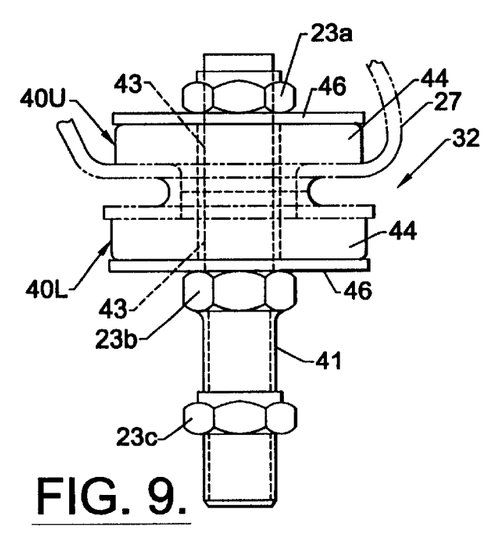
FIG. 9 is a side view of the outboard isolator.
Figure 10:
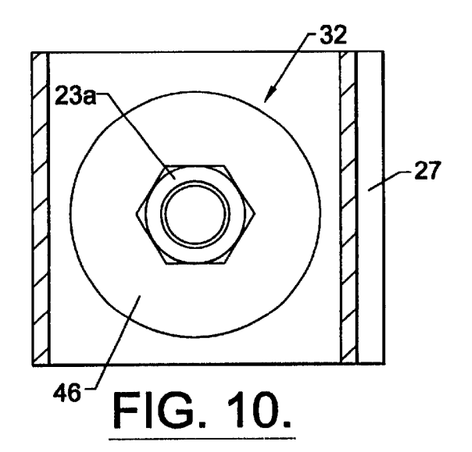
FIG. 10 is a top view of the outboard isolator of FIG. 9.

In both the FIG. 11 and FIG. 12 embodiments, the annular portion 52 is preferably bonded to the cylindrical portion 48 via a suitable bonding process known to those of ordinary skill in the art. In the FIG. 11 embodiment, the sandwich elastomer portion 50 is bonded to the radially extending portion 46, whilst in the FIG. 12 embodiment, the radially extending portion 48 is unbonded to the sandwich elastomer portion 50 and the radially extending portion 46 is comprised of a separate flat washer. The bore 43 receives the stud 41 (FIG. 9). Preferably, the elastomer utilized for the mountings 40U, 40L is silicone or other like high temperature material.

As best exemplified in FIGS. 2a and 4, the means for connecting the plurality of linkages 26 to the engine 22 at their inboard ends 28 preferably comprises a plurality of brackets 54a–56b for attachment to the engine 22 and a plurality of separate clevis members 56a–56c one each being secured to each of the brackets 54a–54b. As best shown in FIG. 4, the brackets 54a are preferably attached to the engine via engine bolts 55. Similar bolts attach brackets 54b. The clevis members, such as member 54c shown comprise one or more devises (ex. Clevises 62a, 62b, 62c) and a tapered pilot 58. In this figure a three linkage clevis member is shown. But as can be seen in FIG. 2a, single 54a and double 54b linkage clevis members are also utilized in the system 20.

To secure the bracket 54c to the clevis member 56c, a bolt 64 is inserted through a bore 68 in the clevis member 56c through bore 63 in bracket 54b and a nut 66 is threaded thereon. This draws the tapered pilot 58 into a like tapered recess 70 securing the clevis member 56c to the bracket 54a. The elastomer rod ends 34 attach to the linkage 26 by threading the threaded shaft 45a into the threaded end 45b of the linkage 26. A jam nut 23c' prevents backoff of the elastomer rod end 34. A through bolt 69b and nut (not shown) securely attach the inner member (not shown) of the elastomer rod end 34 to the clevis 62c. Like fastening means are employed for all the elastomer rod ends 34.

Now referring to FIGS. 5–7b, the preferred elastomer rod end 34 is illustrated. The elastomer rod end 34 comprises a rigid housing 35 including a preferably spherical-shaped pocket 39 formed in a head portion 29 thereof and a threaded shaft 45a for insertion into the like threaded portions 45b of the inboard end 28 of linkages 26 (FIG. 8). A bonded insert 31 including a rigid inner member 38 is rotatably received in the pocket 39 thereby accommodating pivotal motion between the housing 35 and insert 31. The housing 35 is preferably manufactured from stainless steel or titanium and the inner member 38 is preferably aluminum. The insert 31 includes a thin elastomer layer 36 to provide an elastomer discontinuity.

This discontinuity acts as an additional barrier to sound transmission through the link. By way of example, and not to be considered limiting, the elastomeric rod end preferably includes a very high spring rate of about 500,000–2,000,000 lbs./inch (87,000–348,000 N/mm). The material utilized for the elastomer layer 36 is preferably a synthetic elastomer, such as an epichlorohydrin elastomer having a static shear modulus of between about 250–750 psi and more preferably about 500 psi and a thickness of about 0.03–0.05 inches (0.76–1.27 mm) and more preferably about 0.04 inch (1.02 mm).

The thin layer 36 is bonded to the preferably spherical outer surface 37 of the inner member 38 through conventional means. Notably, the elastomer layer 36 is preferably unbonded to the pocket 39 of the housing 35. A Molycoat lubricant (dry film lubricant) is preferably used on the pocket 39 to aid in assembly. The bonded insert assembly 31 is preferably separately bonded and then inserted into the pocket 39 in the housing 35 by turning it endways and inserting through localized windows 47 formed in the head 29 then rotating the bonded insert 31 into place. The outer dimension of the bonded insert 31 are preferably a precompressed fit with the pocket 39. This allows for no play in the elastomer rod end 34 while still allowing the pocket 39 and exterior surface 33 of the bonded insert 31 to slide relative to one another thereby providing significant misalignment capability yet minimizing wear, fretting and vibration at the connection point experienced by prior art systems.

Alternatively, the housing 35 and inner member 38 may be placed in a mold and the elastomer transferred or injected into the pocket 39 under pressure where only the outer surface 37 of the inner member 38 includes a bonding adhesive; the pocket 39 being devoid of adhesive. This also results in the elastomer layer 36 being unbonded to the pocket 39 and generally precompressed. Preferably, the amount of precompression is to be maximized. The elastomer discontinuity formed by the elastomer layer 36 and the damping provided thereby aid in reducing vibration and noise transmission into the linkages 26. Moreover, the isolator inserts 31 may be easily removed to allow tuning of the dynamics of the system via changing the mountings 40U, 40L, such as to avoid linkage resonance. Further, interchangeable inserts may be bonded in several different materials exhibiting more or less damping.

The linkage 26 is best illustrated in FIG. 8 and comprises a tubular portion 49 with threaded end caps 51a, 51b welded thereto. The outboard end cap 51a includes right hand threads whereas the inboard end cap 51b includes left hand threads. The tube 49 and end caps 51a, 51b are preferably manufactured from stainless steel or titanium.

Figure 13:
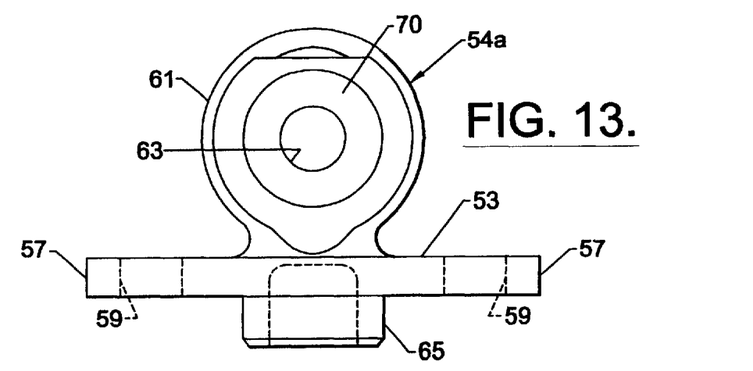
FIG. 13 is a top view of an engine attachment bracket.
Figure 14:
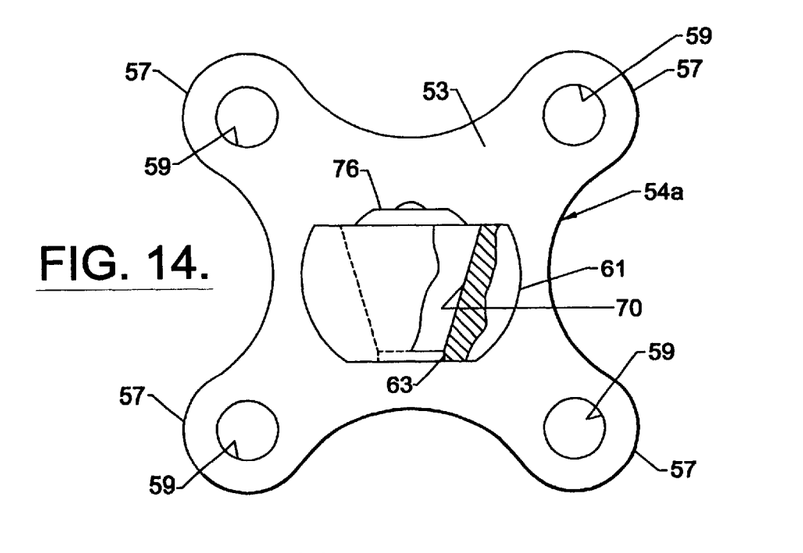
FIG. 14 is a frontal view of the engine attachment bracket of FIG. 14.

FIGS. 13 and 14 illustrate a typical engine bracket 54a for attachment to the outside of the engine 22. The bracket 54a comprises a planar flange 53 including a plurality of lugs 57 having a plurality of engine bolt holes 59 formed therein. A projecting portion 61 depends from the planar flange 53 and includes the tapered recess 70, through bore 63, and alignment tab 76. An engine pilot 65 positions the bracket 54a relative to a like-shaped bore formed on the engine casing (not shown). The bracket 54a may be manufactured from titanium or stainless steel material or other suitable rigid material. The offset of the through bore 63 and tapered portion 70 from the planar flange 53 should be manufactured to meet the clearance requirements for each respective clevis member. For example, the triple clevis member 56c requires more clearance on the bracket 54b than the double or single, as best shown in FIG. 2a, thus the bore 63 would be positioned further from the planar flange 53.

Figure 15:
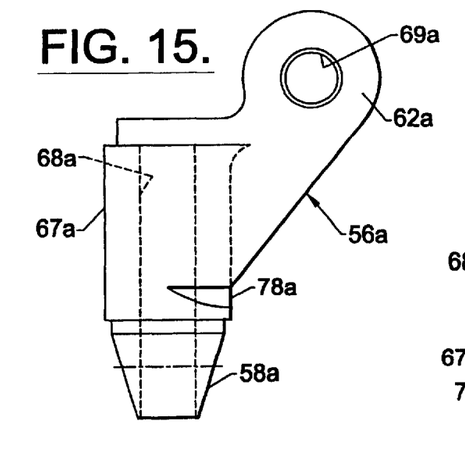
FIG. 15 is a frontal view of a single link clevis member.
Figure 16:
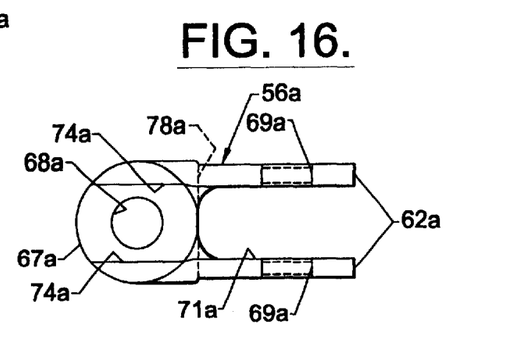
FIG. 16 is a side view of the single link clevis member of FIG. 15.

FIGS. 15 and 16 illustrate a typical single clevis member 56a which comprises a body portion 67a and a clevis 62a extending and offset therefrom. The body portion 67a includes a tapered pilot 58a, a bore 68a, and flat register surface 78a. Cross holes 69a formed in the clevis 62a receive a bolt which attaches, for example, the elastomer rod end 34 (FIG. 2a) to the clevis member 56a. A slot 71a formed between the devises 62a receives the head of the elastomer rod end 34 (FIG. 2a). The single clevis members 56a attach linkages 25f and 25g to the brackets 54a on the right and left aft sides of the engine 22. The outboard ends 30 of the linkages 25f, 25g are preferably oriented such that they angle towards each other. Flats 74a formed on the body 67a register with, and prevent the rotation of, bolt 64 (FIG. 4). This enables easy one-handed installation of the nut 66 (FIG. 4). Upon tightening the bolt (ex. 64 of FIG. 4) thereby drawing the taper 58a into the recess 70, the tab 76a registers with flat register surface 78a to ensure alignment and prevent rotation to the clevis member 56a relative to the bracket 54a. Similar locating means are provided on the bracket/clevis member assemblies described with reference to FIGS. 17–20.

Figure 17:
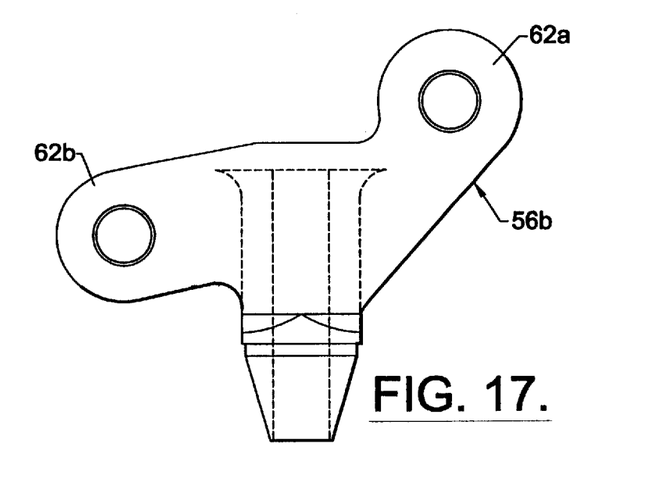
FIG. 17 is a frontal view of a double link clevis member.
Figure 18:
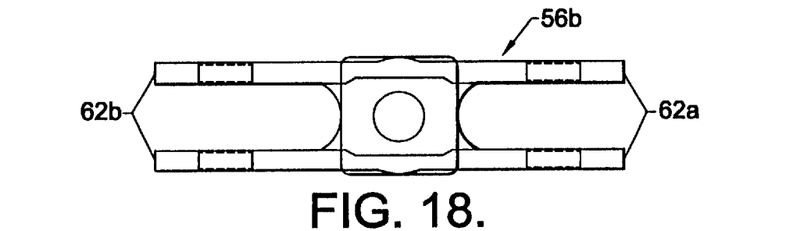
FIG. 18 is a side view of the double link clevis member of FIG. 17.
Figures 19, 20:
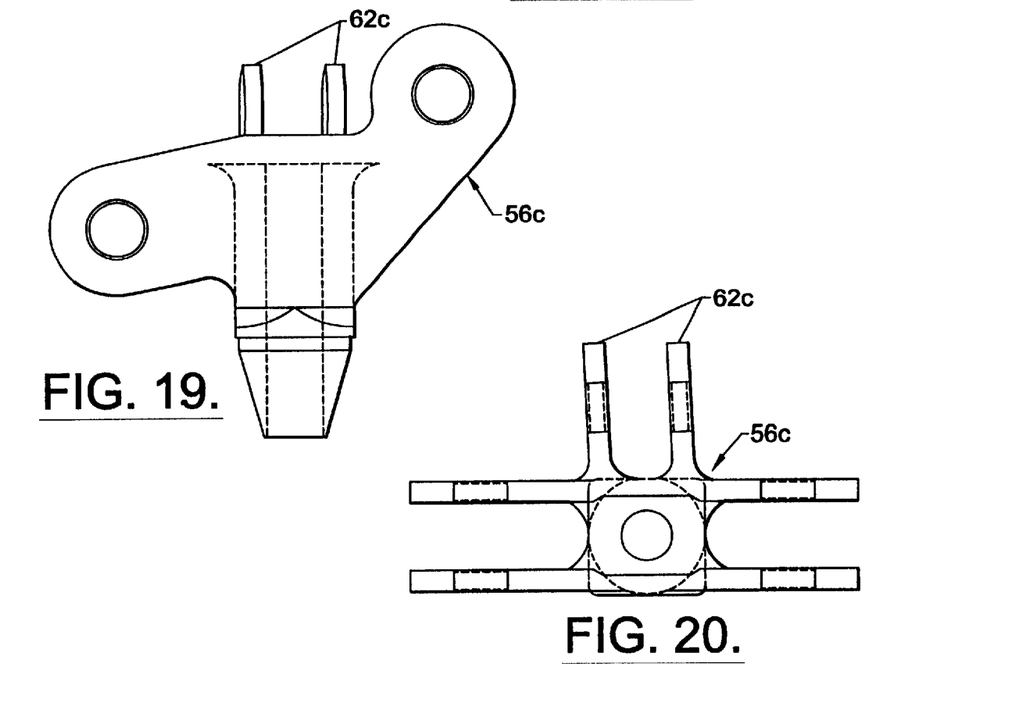
FIG. 19 is a frontal view of a triple link clevis member.
FIG. 20 is a side view of the triple link clevis member of FIG. 19.

FIGS. 17 and 18 illustrate a double clevis member 56b to which two linkage ssemblies 25a, 25b attach (FIG. 2a). These two linkage assemblies 25a, 25b preferably attach to the front right side of the engine 22. The structure of this clevis member 56b and its attachment to the bracket 54a is identical to the single clevis member 56a except that it includes an additional clevis 62b. Linkages 25a, 25b angle forward and aft of the clevis member 56b, respectively, but attach in line with a for-and-aft extending vertical plane passing through the bracket 54a. Similarly, FIGS. 19 and 20 illustrates a triple clevis member 56c to which three linkage assemblies 25c, 25d, and 25e each attach. Preferably, the triple clevis 56c attaches to bracket 54b on the left front of the engine 22. The structure of this clevis member 56c and its attachment to the bracket 54b is identical to the double clevis member 56b (FIG. 17, 18) except that it includes an additional clevis 62c. Of the linkage assemblies 25c, 25d, 25e, the first 25c angles forward, the third 25e angles aft and the second 25d angles right to secure to the structure above the engine's center of gravity.

Figure 21:
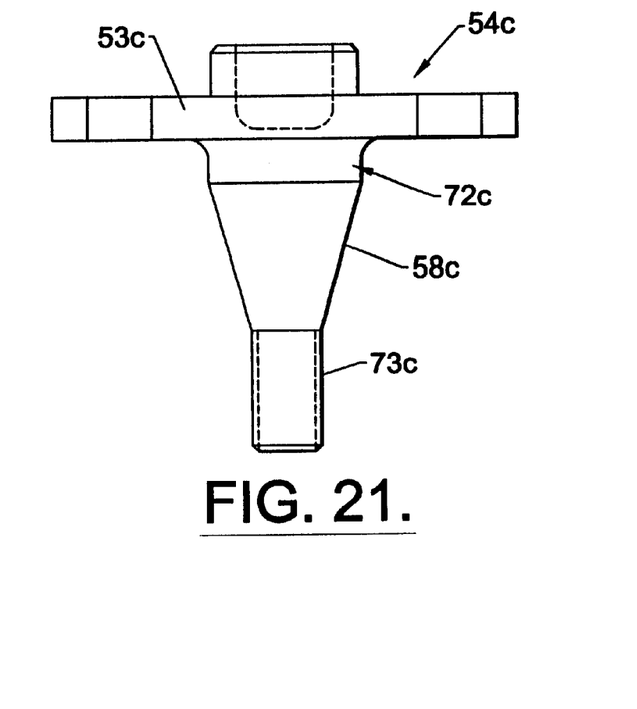
FIG. 21 is a frontal view of another embodiment of engine attachment bracket.
Figure 22:
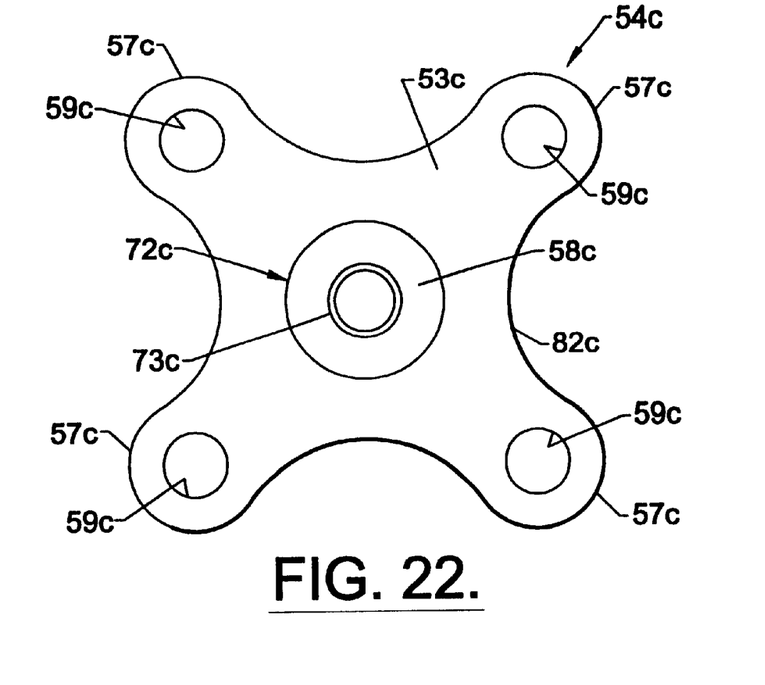
FIG. 22 is a side view of the engine attachment bracket of FIG. 21.

FIGS. 21 and 22 illustrate another type of engine bracket 54c. This engine bracket 54c would be used to replace the two brackets 54a mounted on the aft sides of the engine by mounting on the aft top of the engine instead As shown in FIG. 2a. This engine bracket 54c comprises a planar flange 53c including a cone bolt portion 72c extending therefrom. The cone bolt portion 72c includes a tapered pilot 58c and a threaded portion 73c. The planar flange 53c includes a plurality of lugs 57c including holes 59c for attachment to the top of the engine.

Figure 2B:
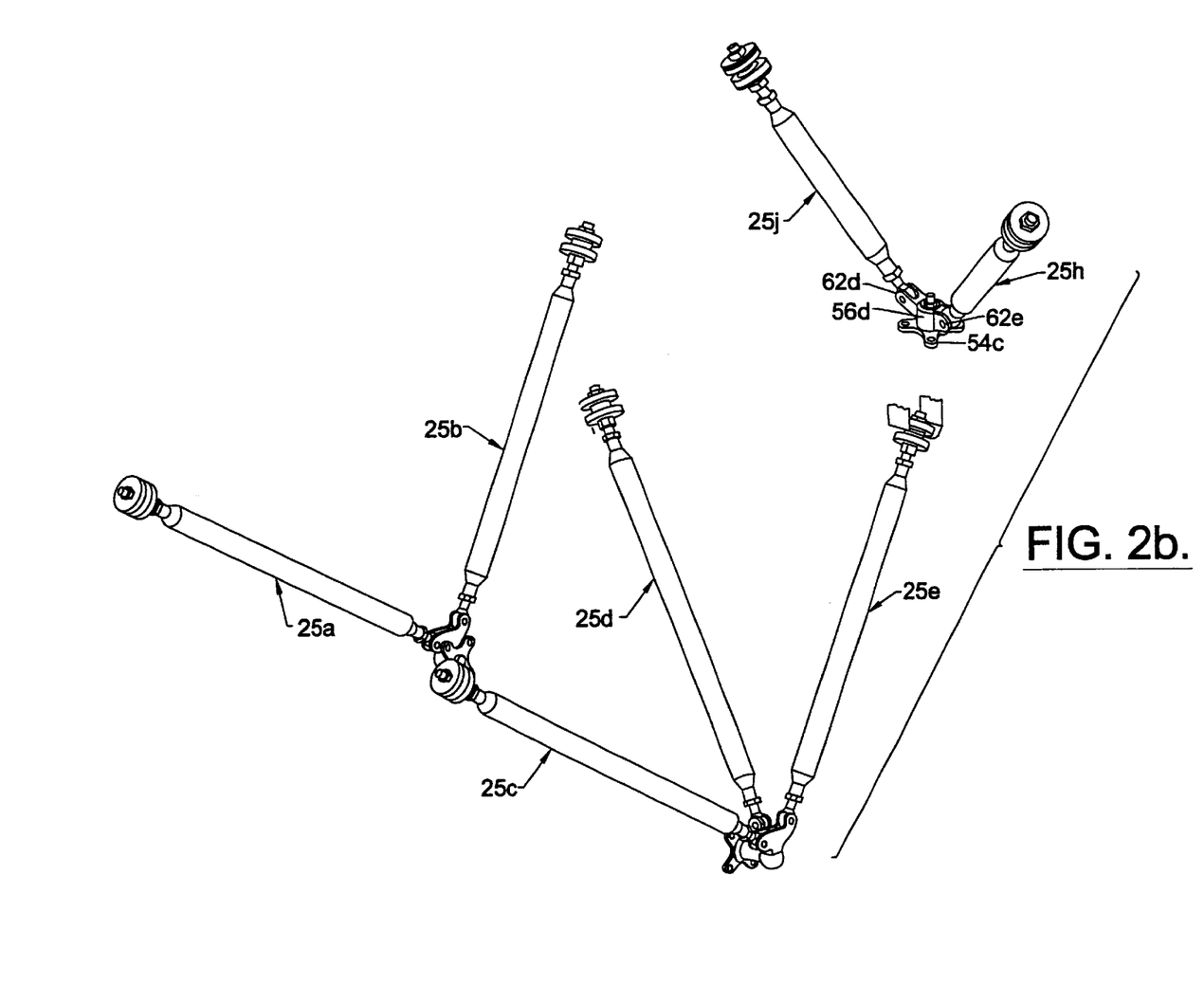
FIG. 2b is an isometric view of a three point mounting system according an embodiment of the present invention with the engine and structure removed for clarity.
Figure 23:
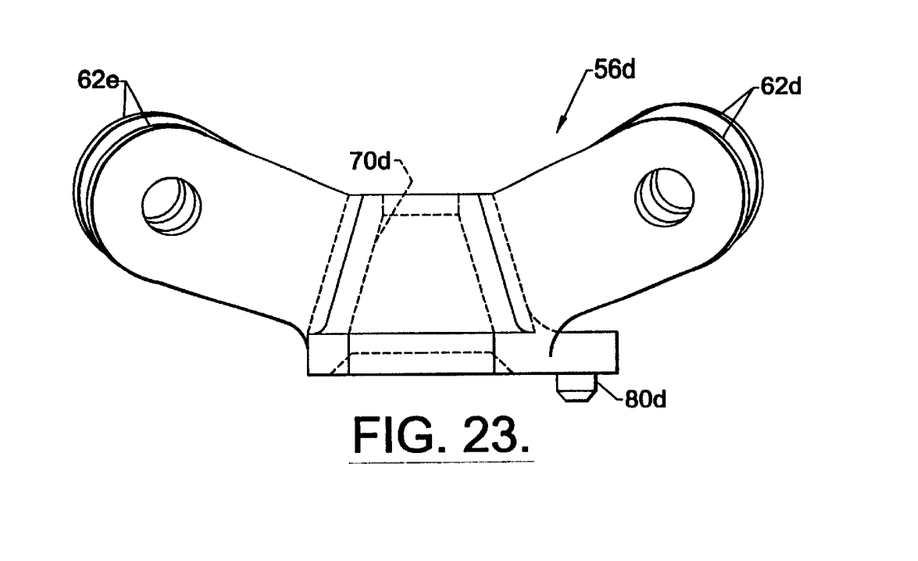
FIG. 23 is a frontal view of another double link clevis member.
Figure 24:
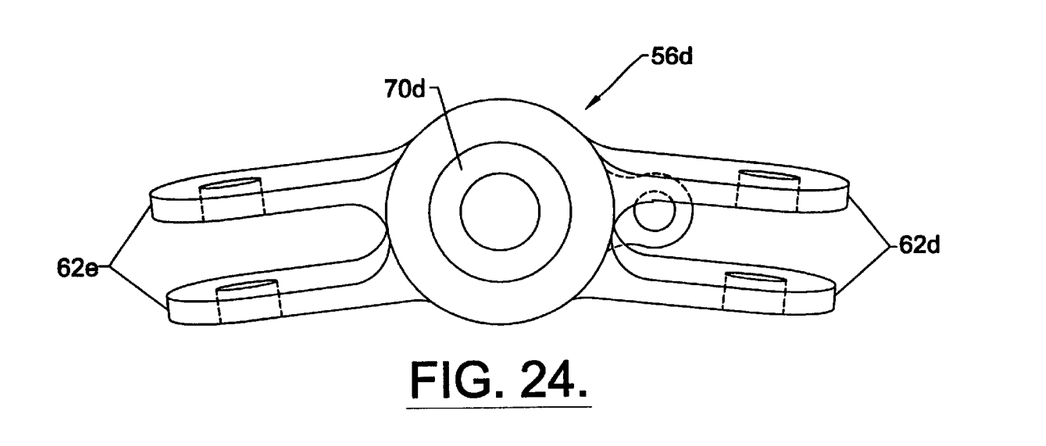
FIG. 24 is a top view of the double link clevis member of FIG. 23.

FIGS. 23 and 24 illustrate the double linkage clevis member 56d (FIG. 2b) which is used with the bracket 54c of FIGS. 21 and 22. Two aft linkages 25h and 25j of the three point mounting system shown in FIG. 2b are secured in the devises 62d, 62e of clevis member 56d via bolts. In FIG. 2b, the outboard ends of the linkages 25h, 25j diverge outwardly from each other and attach to the structure (not shown). The orientation of the other linkages assemblies 25a–25e are the same as in the FIG. 2a embodiment. As with the other afore-described clevis assemblies and brackets, the tapered recess 70d is received over the tapered pilot 58c (FIG. 21) and secured in place with a nut threaded onto the threaded portion 73c. To prevent rotation between the clevis member 56d and bracket 54c, a pin 80d registers with the cutout portion 82c of flange 53c. Preferably, the clevis members 56a, 56b, 56c and brackets 54a, 54b, 54c may be manufactured from cast Titanium, such as 6Al-4V, or cast Stainless Steel, such as 15-5PH.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. For example, it will be appreciated that different constructions and arrangements of the attachment brackets, clevis members linkages and the outboard isolators may be used. In the claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A suspension system for supporting an engine relative to a structure comprising a plurality of linkage assemblies extending from the engine towards the structure, each of said plurality of linkage assemblies including;

(a) a slender linkage having an inboard end and an outboard end, (b) an outboard isolating mount attached at said outboard end, said isolating mount including opposed mounts adapted to be interconnected to the structure, each said opposed mount including elastomer having a sandwich portion and an annular portion extending therefrom and a rigid support member bonded to said elastomer.

(c) a rod end attached at said inboard end, said rod end including a housing, an inner member and an elastomer layer bonded to said inner member but unbonded to said housing, (d) a bracket adapted for attachment to the engine, and (e) a clevis member secured to said bracket, said elastomer rod end received by said clevis member for interconnecting said linkage to the engine.

2. The suspension system of claim 1 wherein said elastomer layer is bonded to an outer surface of the inner member.

3. The suspension system of claim 1 wherein said housing includes a pocket formed therein, said inner member rotatably received in said pocket, said elastomer layer bonded to an outer surface of said inner member.

4. The suspension system of claim 1 wherein said elastomer layer comprises a epichlorohydrin elastomer.

5. The Suspension system of claim 1 wherein said elastomer layer exhibits a shear modulus of between about 250 psi and 750 psi.

6. The Suspension system of claim 1 wherein said elastomer layer has a layer thickness of between about 0.03 inch and 0.05 inch.

7. The suspension system of claim 1 wherein at least one of said opposed mounts comprises a silicone elastomer.

8. The suspension system of claim 1 wherein a stud is received through a bore formed through at least one of said opposed mounts and said stud is likewise threaded into said outboard end of at least one of said plurality of linkages.

9. The suspension system of claim 1 wherein at least one of said plurality of brackets or plurality of separate clevis members includes a tapered pilot.

10. The suspension system of claim 1 wherein said isolating mount has a spring rate and said spring rate comprises a static spring rate in an axial direction in the range of about 15,000 lbs/inch and about 150,000 lbs/inch and a static spring rate in a radial direction in the range of about 10,000 lbs/inch and 100,000 lbs/inch.

11. The suspension system of claim 10 wherein said means including said rod end comprises a spring rate in the range of about 500,000 lbs/inch to about 2,000,000 lbs/inch.

* * * * *